(12) United States Patent
Braun et al.

(10) Patent No.: US 7,104,071 B2
(45) Date of Patent: Sep. 12, 2006

(54) METHOD FOR OPERATING A GAS TURBINE GROUP

(75) Inventors: Jost Braun, Waldshut-Tiengen (DE); Jürgen Hoffmann, Untersiggenthal (CH); Uwe Möller, Schinznach-Bad (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/885,003

(22) Filed: Jul. 7, 2004

(65) Prior Publication Data

US 2005/0109033 A1 May 26, 2005

Related U.S. Application Data

(63) Continuation of application No. PCT/CH02/00709, filed on Dec. 17, 2002.

(30) Foreign Application Priority Data

Jan. 7, 2002 (DE) .......................... 102 00 312
Feb. 19, 2002 (CH) .............................. 0284/02

(51) Int. Cl.
*F02C 3/30* (2006.01)
*F02C 9/00* (2006.01)

(52) U.S. Cl. .................. 60/775; 60/39.26; 60/39.3; 60/728

(58) Field of Classification Search ............... 60/39.26, 60/39.281, 39.3, 39.53, 728, 775
See application file for complete search history.

(56) References Cited

U.S. PATENT DOCUMENTS

| | | | |
|---|---|---|---|
| 2,686,631 A | 8/1954 | Jordan | 230/209 |
| 2,974,482 A | 3/1961 | Kelley | 60/39.3 |
| 3,166,902 A * | 1/1965 | Maljanian et al. | 60/792 |
| 3,867,811 A | 2/1975 | Waeselynck | 60/39.03 |
| 4,002,023 A | 1/1977 | Hartmann | 60/39.31 |
| 4,036,028 A | 7/1977 | Mandrin | 62/52 |
| 4,418,527 A | 12/1983 | Schlom et al. | 60/39.05 |
| 4,519,207 A | 5/1985 | Okabe et al. | 60/39.182 |
| 4,572,428 A | 2/1986 | Groff et al. | 236/44 A |
| 4,667,465 A | 5/1987 | Munk | 60/39.3 |
| 4,702,074 A | 10/1987 | Munk | 60/39.511 |
| 4,893,466 A | 1/1990 | Egnell et al. | 60/39.03 |
| 4,928,478 A | 5/1990 | Maslak | 60/39.05 |
| 5,083,423 A | 1/1992 | Prochaska et al. | 60/39.02 |
| 5,203,161 A | 4/1993 | Lehto | 60/39.53 |
| 5,282,726 A | 2/1994 | Warren | 417/243 |
| 5,353,585 A | 10/1994 | Munk | 60/39.05 |
| 5,454,220 A | 10/1995 | Althaus et al. | 60/39.04 |

(Continued)

FOREIGN PATENT DOCUMENTS

| | | |
|---|---|---|
| CH | 210657 | 7/1940 |
| EP | 0 247 984 A1 | 12/1987 |
| EP | 0 620 362 A1 | 10/1994 |
| EP | 0 781 909 A2 | 7/1997 |
| EP | 0 995 891 A2 | 4/2000 |
| WO | WO 00/08326 | 2/2000 |

*Primary Examiner*—Louis J. Casaregola
(74) *Attorney, Agent, or Firm*—Steptoe & Johnson LLP (57) ABSTRACT

A gas turbine group is provided with at least one cooling apparatus for cooling the working medium before and/or during the compression. The cooling power of the cooling apparatus can be adjusted by suitable means. A controller controls the cooling power of the cooling apparatus as a function of a control deviation in the useful power of the gas turbine group. The cooling controller interacts with other controllers of the gas turbine group in such a way that the gas turbine group is itself always operated at least close to its full load operating state. In this context, it is preferable for the inlet guide vane row of the compressor to be maximally open, and for the hot-gas temperature on entry into the turbines to be controlled so that it is constantly at an upper limit value.

23 Claims, 3 Drawing Sheets

U.S. PATENT DOCUMENTS

| | | |
|---|---|---|
| 5,463,873 A | 11/1995 | Early et al. .................... 62/121 |
| 5,496,012 A | 3/1996 | Kenny, III ................... 251/294 |
| 5,525,268 A | 6/1996 | Reens ....................... 261/78.2 |
| 5,553,448 A | 9/1996 | Farrell et al. ............ 60/39.161 |
| 5,622,044 A | 4/1997 | Bronicki et al. ......... 60/39.182 |
| 5,634,327 A | 6/1997 | Kamber et al. ............ 60/39.03 |
| 5,790,972 A | 8/1998 | Kohlenberger ............... 701/103 |
| 6,012,279 A | 1/2000 | Hines ........................ 60/39.05 |
| 6,216,443 B1 | 4/2001 | Utamura .................... 60/39.53 |
| 6,250,064 B1 | 6/2001 | Tomlinson et al. ........ 60/39.05 |
| 6,516,603 B1 * | 2/2003 | Urbach et al. ............... 60/39.3 |
| 2004/0112037 A1 * | 6/2004 | Yagi et al. ................... 60/39.3 |

* cited by examiner

METHOD FOR OPERATING A GAS TURBINE GROUP

CROSS-REFERENCE TO RELATED APPLICATIONS

This application is a continuation of the U.S. National Stage designation of co-pending International Patent Application PCT/CH02/00709 filed Dec. 17, 2002, the entire content of which is expressly incorporated herein by reference thereto.

FIELD OF THE INVENTION

The present invention relates to a method for operating a gas turbine group.

BACKGROUND OF THE INVENTION

In today's deregulated energy markets, covering peak load demand and the rapid provision of reserves of power has become a lucrative source of income for power plant operators. A number of methods for increasing power, such as the injection of water or steam in the combustion chamber, cooling or intercooling of the inlet air or injection of water into the compressor, are known measures for covering peak loads. The prior art in this context is a simple "on/off function", but with all known methods it is typical to expect an increase in the wear to parts that are critical to service life.

For example U.S. Pat. No. 6,012,279 describes a method for operating a gas turbine group in which either the inlet air into the compressor or the partially compressed air between compressor stages, or both locations, is cooled. The cooling is in this case effected by injection of water and is not controlled. The result of the injection is that the temperature of the air to be compressed further is reduced, leading to a reduction in the compressor work. Moreover, the injection of water leads to an increase in the overall mass flow. Both the effects lead to an increase in power.

U.S. Pat. No. 5,463,873 on the other hand describes a method for operating a gas turbine group in which the air is cooled with the aid of what is described as "fogging" before it enters the compressor. In this case, the intake air is cooled by evaporation of water, producing a humidity level close to the saturation limit, before it enters the gas turbine. The maximum steam saturation of the inlet air is used as a control variable for controlling the fogging. A similar method is also described, for example, by U.S. Pat. No. 6,250,064.

Furthermore, U.S. Pat. No. 5,622,044 describes a method for operating a gas turbine, in which a preliminary compressor is connected upstream of the gas turbine. This preliminary compressor is driven by a separate electric motor, and the inlet air of the preliminary compressor is cooled by means of a water spray, as optionally is the pre-compressed air emerging from the preliminary compressor. The objective in this context is to allow the gas turbine group, in terms of its power, to operate as independently as possible of the ambient temperature.

A further document to be mentioned in this context is U.S. Pat. No. 6,216,443 which describes a gas turbine in which the power is increased by the injection of water droplets between intake muffler and compressor inlet, with the droplet size being in the range from 1 to 50 µm. In this context, the procedure is that to increase the available power of the gas turbine installation by a defined percentage, a defined quantity of water to be injected is calculated. This quantity is then fed to the inlet air by opening a control valve for supplying water accordingly. During this time, the supply of fuel is kept at a constant level. Only thereafter is the supply of fuel into the combustion chamber increased. One problem with this procedure is the fact that the injection of water upstream of the compressor leads to a change in the combustion temperature in the combustion chamber, and accordingly stability problems may arise as a result of the procedure described in this document. To summarize, with a procedure in accordance with U.S. Pat. No. 6,216,443 the setting of the water injection is operated in an open-loop control circuit. In particular, it should be noted that the setting of the water quantity or the cooling power and the setting of the fuel quantity take place sequentially, i.e. one after the other in terms of time. Furthermore, it must be noted that according to the procedure disclosed in U.S. Pat. No. 6,216,443, it is impossible to ensure that the machine will actually operate at its nominal full load and therefore generally at its optimum efficiency. For example, if the precalculated water quantity is too large, the gas turbine, on reaching the set power, will either be operated below its maximum firing temperature, or, if applicable, will not be operated with a fully open inlet guide vane row. Both of these problems are harmful to the gas turbine efficiency.

SUMMARY OF THE INVENTION

The invention involves using controlled cooling of the intake working fluid and/or partially compressed working fluid as a function of the desired power, i.e. to use the useful power of the gas turbine group as a lead parameter for the control which is to be implemented. This maintains a control operating state in which at least one process parameter is controlled to a set value, i.e. is held at a defined value.

According to the invention the cooling power and the heat flux to the working fluid, per se are controlled in parallel, in that the two can be adjusted alternately as a function of one another. The working fluid may herein equivalently be referred to as the working medium.

In cases where the heat is supplied by burning fuel in a combustion chamber the heat flux may equivalently be expressed as the fuel mass flow introduced.

In one aspect of the invention, the cooling is operated as a guide variable in a closed-loop control circuit with a useful power parameter, for example the shaft power of the gas turbine group or also the generator power of a single-shaft combined installation, as is known from the prior art, while at the same time a further crucial process parameter, for example, the turbine inlet temperature, is primarily kept constant by controlling the fuel quantity and an adjustable inlet guide vane row, wherein the invention fundamentally differs, for example, from the prior art that is known from U.S. Pat. No. 6,216,443 by virtue of the control of the cooling power in the closed-loop control circuit.

An advantage of this closed-loop control resides, in the following: up to a nominal full load, a gas turbine group is operated in accordance with control concepts that are known per se. This means that normally the power is first of all controlled in a manner known per se by varying the hot-gas temperature at the turbine inlet and the mass flow of working fluid. The latter may be controlled in varying the position of a compressor variable inlet guide vane row. According to an exemplary operating concept, the inlet guide vane row is fully open at nominal full load (when the quantity of fresh gas sucked in is at a maximum), and the firing of the gas turbine group is at a maximum, such that the hot-gas temperature reaches an upper limit value. In this context, the limit value is preset, for example, by a maximum permissible turbine inlet temperature. Then, to provide a further increase in power, a power controller is activated, and this power controller activates the cooling of the sucked-in and/or partially compressed working medium as a function of a control deviation in the useful power. What this means in simplified terms is that the cooling is switched on and at the same time, furthermore, at least one process parameter, such as the turbine inlet temperature, is kept at least approximately constant, and at the same time the inlet guide vane row held substantially open, for example by an increased supply of fuel. The actual operations involved in this context are as follows: in operation at nominal full load without cooling of the intake working medium, a controller that holds the process variable to be maintained constant at a set value, for example limits it to a maximum value, is active. This does not even out a control deviation in the useful power, i.e. the set power is greater than the actual power. Evening out a control parameter or a control deviation herein shall mean that a value of this parameter is controlled to be a set value, or the control deviation becomes zero, or at least close to zero within the limits of the controller. Only when this controller has performed all its interventions in order to increase the power without exceeding the maximum value mentioned is a second controller activated, acting on the cooling power. This cooling power is varied, either continuously or in finite steps. Of course, the cooling of the intake working medium also affects the overall working process of the gas turbine group; it therefore also acts, as it were, as an interfering variable for the control circuit of the first controller. The first controller therefore drops out of the limiter or records a deviation in the process parameter that is to be kept constant from the set value. In this context, the first controller also is provided with degrees of freedom in order to increase the power within its control domain. In this context, therefore, the first controller regains control until a limiter is reached once again, whereupon the second controller is in turn activated and increases the cooling power further. In other words, there is a parallel interaction of two controllers, a useful net power controller acting on the cooling power and a temperature controller acting on the heat supply, at the same time. Provided that the dynamics of the control loops are suitably tuned to one another, the cooling power is adapted approximately continuously and the first controller keeps the process parameters determined therein constant within very tight limits until either the power has been evened out by the interaction of the controllers or the second controller has reached a limit, for example, a maximum cooling power. Furthermore, other measures that are known per se for increasing power, such as the introduction of water or steam into the combustion chamber or turbine or into the cooling air system of the gas turbine group, could also be used cumulatively or in parallel with the cooling. It must be assumed that if the cooling power is set in finite steps, in a final state, the first controller will not run completely, as is desired, into the limiter or will no longer be fully able to even out the process parameter that is to be kept constant. However, it will be readily apparent to the person skilled in the art that even this situation can be readily subsumed into the present invention.

Unlike in the methods that are known from the prior art, in particular the combustion conditions are not subject to any transient fluctuations or even sudden changes, which yields significant advantages with regard to stable and safe operation of the gas turbine group in particular when using premix burner technology or auto-igniting combustion chambers. Furthermore, even without any detailed thermodynamic analysis, it can be assumed that operation in which, for example, an inlet guide vane row of the gas turbine group is fully open and the firing of the gas turbine group is at a maximum in each case results in efficient energy conversion.

It is implied in the previous paragraph that the heat supply component is a combustion chamber; however, it is possible without departing from the claimed invention, to use a catalytic converter or a heat exchanger.

An exemplary process parameter to be maintained constant is a temperature of the working medium. In one exemplary embodiment, the critical variable, i.e. the critical process parameter, which the control is designed to maintain, is represented by the temperature of the working medium when it enters a turbine. This temperature may be determined as a mixed temperature. This is to be understood as meaning that direct measurement of the turbine inlet temperature is often not practicable, on account of the high gas temperatures and the immediate proximity of the cooled walls. Therefore, a comparison temperature is calculated, for example, from the temperature downstream of the turbine and the pressure ratio across the turbine. This temperature is referred to as a mixed temperature since the associated measurement includes the cooling-air mass flow; the actual gas temperature at the turbine inlet is higher.

It is known to increase the power by injecting, for example, water and/or steam and/or another suitable medium, such as $CO_2$ or another gas, which may be produced during chemical processes, in order to increase the mass flow upstream of and/or in and/or immediately downstream of the heat supply component, i.e. in general a combustion chamber, into at least part of the compressed intake air or of the hot combustion air. Injection into the combustion chamber usually leads to an increase in the compressor outlet temperature. The additional cooling of the intake air or the additional intercooling reduces the compressor outlet temperature and therefore widens the operating range in which the injection of steam can be used to increase power. Without this combination with the cooling of the working medium before and/or during the compression, there are likely to be limits on the injection into or downstream of the combustion chamber at high ambient temperatures, when the power of the gas turbine power plant is anyway lower and the demand for power is highest for most applications. Therefore, the cooling of the working medium before and/or during the compression may be combined with the described introduction of an additional medium. The introduction of the additional medium, which is generally an inert medium, is effected, for example, by the supply of cooling air for the first row of guide vanes into the hot-gas path, the medium being supplied, for example, via a line that is provided with an actuator and opens out into an annular space for cooling air, with the additional medium then being passed via a cooling air-opening through the heat shield onto the guide vanes of the first turbine guide vane row. Alternatively, or at the same time, it is possible to configure the injection in such a way that it injects additional medium via the cooling-air supply for the blades of the first turbine rotor blade row into the combustion-air path. In principle, injection downstream of the combustion chamber provides the advantage that the injection not only increases the mass flow at the turbine inlet, but also produces an advantageous cooling action. Furthermore, larger quantities of inert medium cannot always be injected into the combustion chamber without problems. In particular, if an inert medium is injected directly into the combustion chamber, this can disrupt combustion, resulting in increased emissions or unstable combustion. The supply of steam to the first guide vane row or to the first turbine rotor blade row furthermore has the advantage that on account of the additional use of steam in the normal cooling-air path, these blades, which are actually designed for air cooling, are cooled to a greater extent than necessary on account of the higher heat capacity and the good heat transfer to steam. Consequently, it then becomes possible potentially to increase the firing temperature further, with the result that the power potentials that can be opened up beyond the actual nominal power of the gas turbine group are additionally increased.

As a result of the control in accordance with the invention, the gas turbine group is at any time operated optimally, i.e. the use of power-increasing measures is optimized for the overall process, and the wear is thereby minimized, and the consumption of fuel, the cooling power and, if appropriate a consumption of coolant, as well as the consumption of steam and/or water that may have been injected, is likewise reduced to the minimum required at any particular time.

Summarizing, the method according to the invention can be described as the actual gas turbine process being operated under full-load conditions or, if the cooling power can only be set in discrete steps, at least close to the full-load conditions, and the power control per se being realized by trimming the full load point by means of the variable cooling of the working medium before and/or during the compression.

According to one embodiment of the invention, a gas turbine group with sequential combustion, as is known, for example, from EP 620 362, in which heat is additionally supplied to the partially expanded working medium at least once between two turbines or turbine stages, is operated using the method of the invention. The optional introduction of additional medium discussed above is in then for example effected at the highest possible pressure level, i.e. in particular in the region of the first combustion chamber.

The cooling of the working medium before and/or during the compression is produced, for example, by a cooling apparatus that is arranged upstream of the compressor or alternatively between a low-pressure compressor and a high-pressure compressor. This cooling apparatus may be a heat exchanger that has working fluid flowing through or around it on the primary side and has a cooling medium flowing through or around it on the secondary side, with the feed temperature and/or the mass flow of the cooling medium being varied as a function of the control deviation in the useful power in order to control the cooling power. As an alternative or in addition, it is also possible for heat-exchanger surfaces to be connected up or disconnected. Identical control mechanisms for the cooling power apply when using an evaporative cooler wetted at a surface over which medium flows. Furthermore, it is also possible to use an injection cooler, the injected liquid mass flow of which is varied. In this context, it is quite possible to make the quantity of water injected such that in actual fact supersaturation of the working medium is achieved, so that liquid enters downstream compressor stages, where it is responsible for internal cooling of the compressor through uptake of heat and evaporation.

The actual power, where accessible, is determined in a manner known per se as the terminal power of a generator that is driven as a power consumer. A measure that is routinely employed by the person skilled in the art is to determine this power by means of strain gauges arranged on the output shaft of the gas turbine group. According to one embodiment of the invention, another suitable process variable or a suitable combination of process variables representing a measure of the power of the gas turbine group is used to determine the actual power. The process variables that are suitable for use as a control variable as a measure of the power include, in particular the exhaust-gas temperature, the hot-gas temperature, the ambient temperature, the compressor outlet pressure, a compressor intermediate pressure, the temperature of specific components, the exhaust-gas heat power and/or the setting of the compressor inlet guide vane rows, or a suitable combination of the abovementioned parameters. According to a further embodiment of the invention, the gas turbine group is integrated in a cogeneration installation with process steam discharge, in which case in particular the exhaust-gas heat power, either alone or in combination with another suitable process variable is used as suitable process variable for controlling the cooling power and/or the injection of the additional medium.

BRIEF DESCRIPTION OF THE DRAWINGS

The invention is to be explained in more detail below on the basis of exemplary embodiments and in conjunction with the drawings, in which.

The exemplary embodiments are to be understood purely as providing instruction concerning the teaching of the invention as characterized in the claims. In particular, the control mechanisms are illustrated in highly simplified manner.

DETAILED DESCRIPTION OF THE PREFERRED EMBODIMENTS

Figure 1:
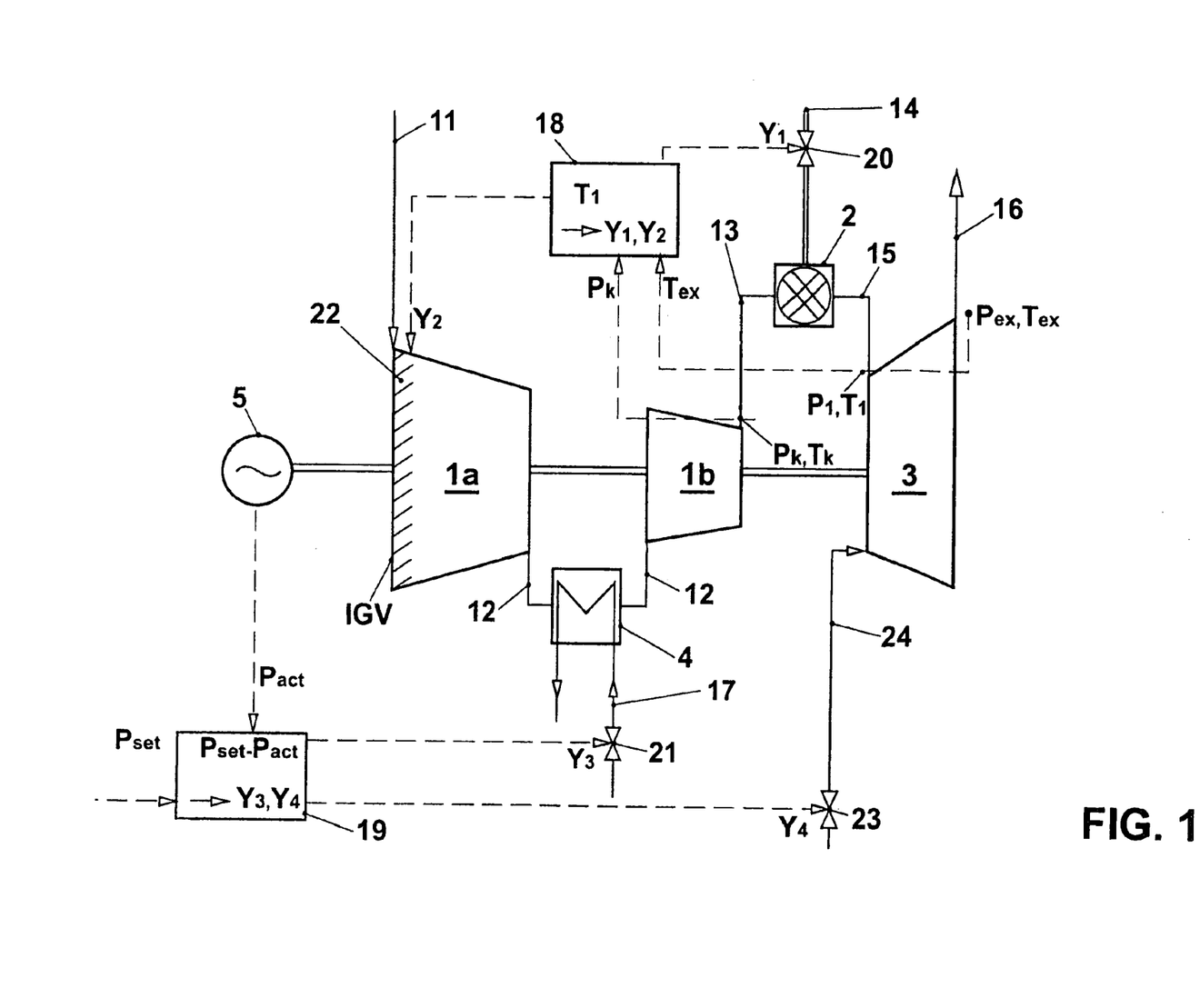
FIG. 1 diagrammatically depicts a gas turbine group with an intercooler in the compressor, with the intercooler being controlled in accordance with the invention.

FIG. 1 shows a gas turbine installation for carrying out a method according to the invention. A compressor 1 comprising a first partial compressor 1a and a second partial compressor 1b, sucks in a quantity of air 11 as working medium for the gas turbine group. This quantity of air is compressed to a first pressure in the first partial compressor 1a, then the partially compressed air 12 flows through a cooling apparatus 4 designed as a heat exchanger and then into the second partial compressor 1b, where the air is compressed further. Compressed working medium 13 flows into a combustion chamber 2 at a pressure $p_k$ and a temperature $T_k$. In the combustion chamber 2, a quantity of fuel 14 is supplied and burnt. Hot gas 15 at a temperature $T_1$ and a pressure $p_1$ flows into the turbine 3, where it is expanded, delivering a useful power, before flowing out as expanded exhaust gas 16 at a temperature $T_{ex}$ and a pressure $p_{ex}$ which substantially corresponds to atmospheric pressure. The considerable waste heat from this gas can be utilized in a manner that is known per se and does not form part of the invention, for example, in a heat recovery steam generator. The turbine drives the compressor and a generator 5. The first partial compressor 1a is provided with an adjustable inlet guide vane row 22, the position IGV of which is the main factor in determining the intake air quantity. The following explanation of the control mechanisms is greatly simplified for the sake of clarity and ease of understanding and is focused on the aspects that are of relevance to the invention. Close to the nominal gas turbine full load, the control is substantially taken over by the controller 18, which at full load operates within a limit for the turbine inlet temperature $T_1$. This temperature generally cannot be determined by direct measurement, but rather is calculated from the compressor final pressure $p_k$ and the turbine outlet temperature $T_{ex}$. The controller acts on the one hand, via control variable $Y_1$, on the fuel quantity actuator 20 and on the other hand, via the control variable $Y_3$, on the position IGV of the inlet guide vane row 22. At full load, the inlet guide vane row is fully open, i.e. the inlet volume flow into the first partial compressor 1a is at a maximum, and the turbine inlet temperature is controlled to a maximum value. At this point, the control method of the invention then intervenes to further increase the power. A second controller 19 records a deviation in the actual power $P_{act}$ from the required set power $P_{set}$. Accordingly, a control variable $Y_3$ is used to act on an actuator 21 for the mass flow of a cooling medium 17 flowing to the heat exchanger 4, increasing this mass flow. As a result, the temperature of the partially compressed working medium 12 on entry into the second partial compressor 1b drops, and therefore so does the compressor outlet temperature $T_k$. As a result, on the one hand the power consumption of the partial compressor 1b drops, which firstly increases the power. On the other hand, if the fuel quantity remains the same, the turbine inlet temperature drops; the controller 18 therefore moves out of the limiter and in turn has degrees of freedom that increase the power; controller 19 then, for example, becomes passive until controller 18 is once again running within the limiter, and only then increases the cooling power of the cooling apparatus by opening the actuator 21 further. This procedure is repeated until the power has either been stabilized or the actuator 21 opened to its maximum extent, i.e. until the cooling power of the cooling apparatus 4 is at a maximum. In this case, the gas turbine group illustrated also has the optional possibility of the controller 19 using a control variable $Y_4$ to act on an actuator 23 so as to pass a quantity of an additional medium 24, for example steam, to the turbine 3 in order to further increase the power of the gas turbine group.

Figure 2:
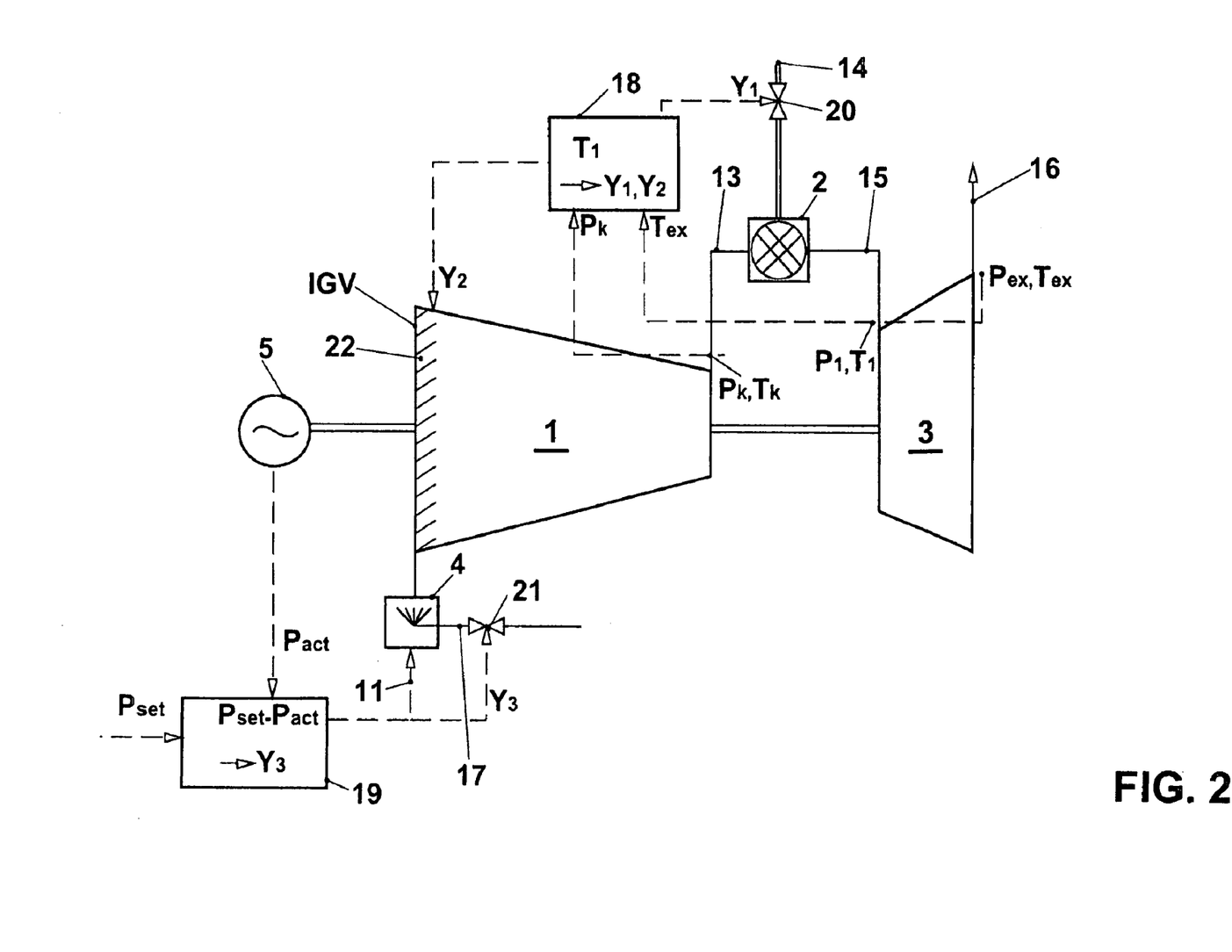
FIG. 2 shows a gas turbine group in which an injection cooler for cooling intake air is controlled in accordance with the invention.

FIG. 2 shows a further embodiment of a gas turbine group for carrying out the method according to the invention. This substantially corresponds to the embodiment illustrated in FIG. 1. The means 4 that are responsible for cooling the working medium are, in this embodiment, arranged upstream of the compressor 1 and are designed as an injection cooler. It is in principle possible to employ a heat exchanger upstream of the compressor, but limits are imposed by the driving temperature differential that is required. Arranging a refrigeration machine at this location is amply disclosed by the prior art. The injection cooler illustrated in this context has the advantage of allowing the intake air 11 initially to be cooled to the cooling limit temperature. If the cooling power is to be increased further, liquid medium enters the compressor. When the temperature of the working fluid in the compressor 1 is increased, the liquid gradually evaporates, and in this way effects internal cooling of the compressor; this results firstly in an increase in the mass flow and secondly in an increase in the power potentials as a result of the reduction in the power consumption of the compressor 1 on account of the cooling. Completely analogously to the control procedure described above in conjunction with FIG. 1, the gas turbine group, according to the invention, is kept within the limiter for the turbine inlet temperature $T_1$ by the controller 18 as a result of the interplay of the position IGV of the inlet guide vane row and the fuel quantity control; the controller 18 is therefore operated as a temperature controller. The controller 19, by contrast, acts as a power controller acting on the quantity of liquid introduced into the cooler 4 through intervention on the actuator 21 by means of the control variable $Y_3$ formed as a function of the control deviation $P_{set}-P_{act}$; increasing the quantity of liquid, generally water, introduced increases the cooling power if more power is required. Of course, it is also possible for an injection cooler to be used as an intercooler.

Figure 3:
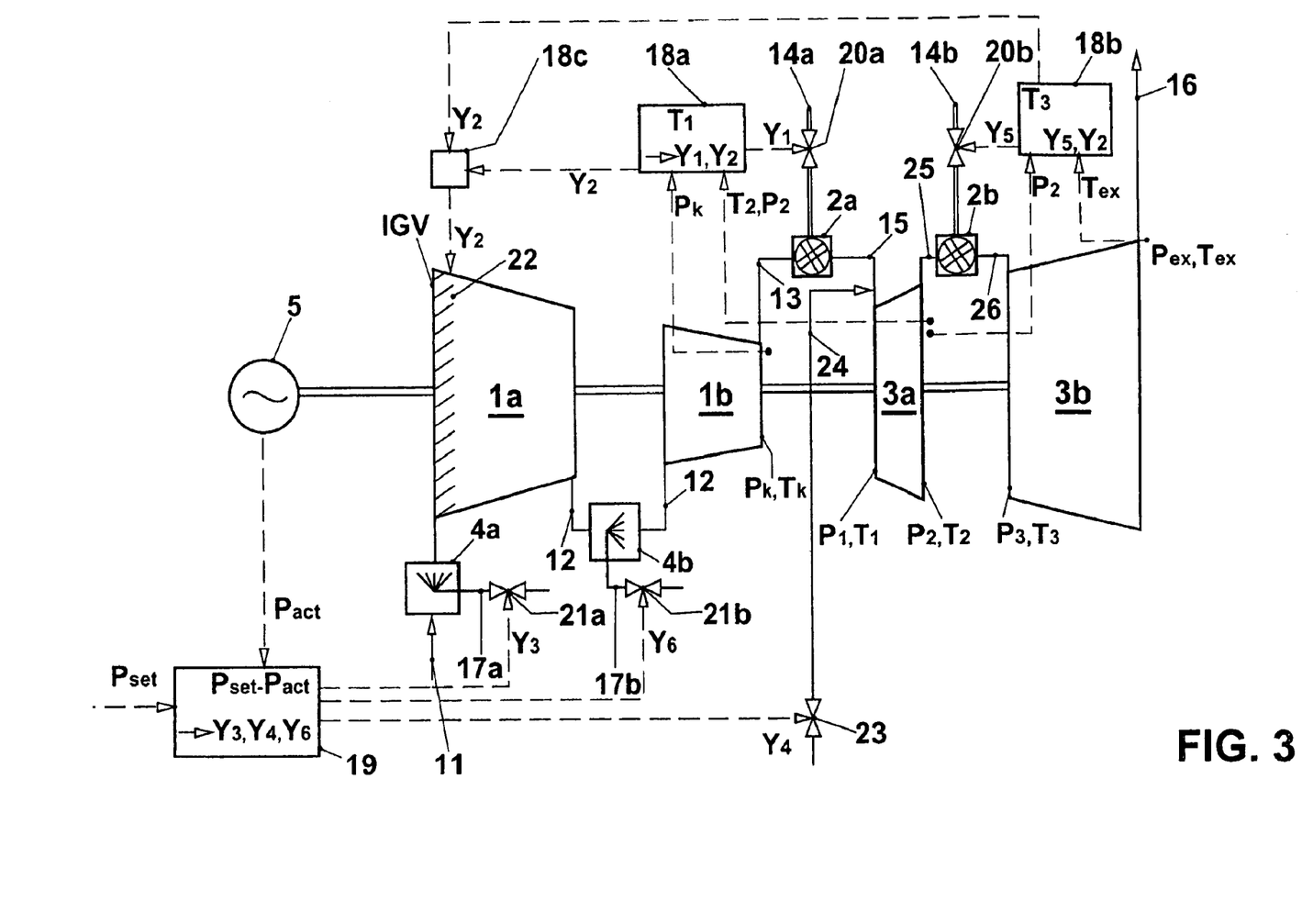
FIG. 3 shows a gas turbine group with sequential combustion and an intake-air cooler and an intercooler, as well as introduction of additional medium upstream of the high-pressure turbine, the coolers and the introduction of additional medium being controlled in accordance with the invention.

FIG. 3 illustrates a gas turbine group with what is known as sequential combustion, as is known per se from EP 620 362. The operating process of the gas turbine group illustrated can be described broadly as a working-medium mass flow 11 flowing through a first cooling apparatus 4a and being compressed in two partial compressors 1a and 1b, with the partially compressed working medium 12 flowing through a second cooling apparatus between the partial compressors. In a first combustion chamber 2a, a fuel quantity 14a is added to the compressed working medium 13 and burnt. The compressed hot flue gas 15 with a temperature $T_1$ and a pressure $p_1$ is partially expanded to pressure $p_2$ in a first turbine 3a; the pressure ratio of this partial expansion is typically in the range from 1.5 to 2. The partially expanded flue gas 25, at temperature $T_2$, under full-load conditions still has an oxygen content of 15% by volume or more. Therefore, further fuel 14b can readily be fed to it in a second combustion chamber 2b and burnt. Flue gas 26 at temperature $T_3$ flows into the second turbine 3b. In the second turbine 3b, the hot gas is expanded to pressure $p_{ex}$, which usually approximately corresponds to ambient pressure. The residual heat of the exhaust gases 16, which are at temperature $T_{ex}$, may be utilized in a manner known per se. The turbines drive the compressor 1a, 1b and a generator 5. In the operating state at which the invention acts, with power demands above the actual nominal full load of the gas turbine group, the inlet guide vane row 22 is fully open, i.e. the intake volumetric flow is at a maximum, and the controllers 18a and 18b control the turbine inlet temperatures $T_1$ and $T_3$ to permissible maximum values. These temperatures are not measured directly, for the reasons that have been explained above, but rather are calculated, for example, from the respective turbine outlet temperatures $T_2$ and $T_{ex}$ and pressure ratios across the turbines 3a and 3b. According to present exemplary embodiment of the invention, the controller 19 is activated in this operating state. If this controller records a control deviation $P_{set}-P_{act}$, it uses the control variables $Y_3$ and $Y_6$ to act in accordance with the invention on the means 21a, 21b for controlling the cooling power. In the case that is illustrated by way of example, these are actuators that control the supply of liquid to the injection coolers 4a and 4b. The advantages which are in principle provided by an injection cooler as intake-air cooler 4a compared to a heat exchanger have been explained in connection with FIG. 2, even though a different type of cooler may readily be used at this location without departing from the scope of the invention. Within the context of the invention, it is also possible for any other desired type of cooler to be used for the intercooler 4b, as has been explained in connection with FIG. 1. In the case illustrated, however, by way of example if a heat exchanger is being used as intercooler 4b, it must be ensured that the temperature does not drop below the dewpoint of the working medium that has been humidified or over-humidified by the intake air cooler 4a. The use of injection coolers has the further advantage of optionally over-humidifying the working medium, such that drops of liquid penetrate into downstream compressor stages, where they internally cool the compressor during the compression operation. Of course, in this context it would also be possible to design the gas turbine group with more than two coolers. Dividing the required cooling power between the individual coolers is a matter of specific thermodynamic design and is of no significance to the invention. As has been explained above, when the cooling apparatuses are activated, the controllers 18a, 18b run out of the temperature limiting. The controller 19 is for the time being deactivated again, and the controllers 18a and 18b once again work as load and temperature controllers, although explaining the detailed interaction between these controllers would depart from the scope of the present description. In one embodiment, in an attempt to keep the turbine inlet temperatures within the limiter, the controllers 18a and 18b act via control variables $Y_2$ on the position IGV of the adjustable inlet guide vane row 22; in this case, the control signals from the two controllers 18a and 18b are processed in the inlet guide vane row controller 18c and only then passed on to the inlet guide vane row. The controllers 18a and 18b then have a degree of freedom, allowing them to react to the power that has not been adjusted to the set value. Interventions on the fuel actuators 20a and 20b increases the fuel quantity supplied to the combustion chambers and, in order to keep the turbine inlet temperatures constant, the inlet guide vane row is opened again. When the inlet guide vane row is fully open again, the controller 19 is activated again and if appropriate, increases the cooling power once again. Given suitably adapted control dynamics, this process takes place continuously. In one embodiment, the cooling power can only be set in stages; in this case, with the power deviation evened out, the gas turbine group may not be running within the limiter of the controllers 18a and 18b, i.e. may not be in its full-load state, and in particular, the inlet guide vane row would not be fully open, but this operating state, with a minor deviation from the full load state of the controllers 18, can nevertheless be subsumed into the concept of the invention. If the cooling power has reached a maximum value and the power has not yet been regulated to the set value, in the turbomachine illustrated, by way of example, steam or another supplemental medium 24 is injected, this injection likewise being controlled by the controller 19 by intervention on the actuator 23. The introduction of additional medium is illustrated upstream of the first turbine 3a, which leads to optimum utilization of the working potential of the supplemental medium; of course, it is also possible for the supplemental medium to be introduced completely or partially downstream of the second combustion chamber 2b if there is a risk of the supplemental medium having an adverse effect on the combustion in the second combustion chamber 2b, or if the capacity of the high-pressure turbine 3a is exhausted. The supplemental medium could also be introduced by the cooling system of the gas turbine group; the operating method according to the invention would then be linked in a suitable way—in cascaded or parallel form—with a method for increasing the power of a gas turbine group that is known from EP 995 891. This will readily open up further options to the person skilled in the art for realizing the invention without in so doing departing from the scope of the present invention.

LIST OF DESIGNATIONS

| | |
|---|---|
| 1 | Compressor |
| 1a | Partial compressor, low-pressure compressor |
| 1b | Partial compressor, high-pressure compressor |
| 2 | Heat supply component, combustion chamber |
| 2a | First combustion chamber, high-pressure combustion chamber |
| 2b | Second combustion chamber, low-pressure combustion chamber |
| 3 | Turbine |
| 3a | First turbine, high-pressure turbine |
| 3b | Second turbine, low-pressure turbine |
| 4 | Cooling apparatus |
| 4a | Cooling apparatus, intake air cooler |
| 4b | Cooling apparatus, intercooler |
| 5 | Generator |
| 11 | Working medium |
| 12 | Partially compressed working medium |
| 13 | Compressed working medium |
| 14, 14a, 14b | Fuel quantity |
| 15 | Expanded heated working medium, hot gas, flue gas |
| 16 | Expanded working medium, expanded flue gas |
| 17, 17a, 17b | Cooling medium |
| 18, 18a, 18b | Controller |
| 18c | Inlet guide vane row controller |
| 19 | Controller |
| 20, 20a, 20b | Fuel quantity actuator |
| 21, 21a, 21b | Actuator for cooling medium, actuator for the cooling power |
| 22 | Inlet guide vane row |
| 23 | Actuator for additional medium |
| 24 | Additional medium |
| 25 | Partially expanded working medium, partially expanded flue gas |
| 26 | Reheated working medium, reheated flue gas |
| IGV | Inlet guide vane row position |
| $LP_{act}$ | Power actual value |
| $P_{set}$ | Power set value |
| $p_1, \ldots p_3, p_k, p_{ex}$ | Process pressures |
| $T_1, \ldots T_3, T_k, T_{ex}$ | Process temperatures |
| $Y_1 \ldots, Y_6$ | Control variables |

What is claimed is:

1. A method for operating a gas turbine group, the method comprising:

compressing a working fluid in at least one compressor;

supplying a heat flux to the compressed working fluid in a heat supply component thus heating the compressed working fluid;

passing the heated working fluid from the heat supply component into at least one turbine;

expanding the working fluid in said turbine;

generating shaft power while expanding the working fluid in the turbine;

driving the compressor with a first fraction of the shaft power;

driving a power consumer with remaining useful shaft power;

cooling the working fluid by applying a cooling power at a position selected from the group consisting of before the compression, during the compression, and both before and during the compression;

regulating the cooling power dependent on a control deviation of the useful shaft power;

evening out the control deviation in regulating the cooling power;

in parallel with regulating the cooling power regulating the heat flux supplied to the compressed working fluid for continuously maintaining at least a turbine inlet temperature of the working fluid substantially constant.

2. The method of claim 1, further comprising maintaining a constant position of an adjustable inlet guide vane row.

3. The method of claim 2, further comprising maintaining the inlet guide vane row in a fully open position.

4. The method of claim 1, further comprising:
partially expanding the working fluid in one selected from the group consisting of at least one turbine and at least one turbine stage; and
at least once supplying heat to a working fluid that has thus been partially expanded, and thereafter passing the working fluid to a further one selected from the group consisting of at least one turbine and at least one turbine stage.

5. The method of claim 1, further comprising:
determining at least one process variable, and indirectly determining the useful shaft power as a function of one selected from the group consisting of a process variable and a combination of at least two process variables.

6. The method of claim 5, wherein the process variable is selected from the group consisting of a exhaust-gas temperature, a turbine inlet temperature, ambient conditions, a compressor exit pressure, a compressor intermediate pressure, setting of variable compressor guide vane rows, and a combination of at least two of said variables.

7. The method of claim 1, further comprising applying the cooling power in passing one of an uncompressed working medium or partially compressed working medium through a primary side of a heat exchanger or around a primary side of a heat exchanger, or both, and providing a coolant to the secondary side of the heat exchanger.

8. The method of claim 7, further comprising adjusting the cooling power in adjusting at least one selected from the group consisting of the feed temperature of the coolant and the coolant mass flow.

9. The method of claim 1, further comprising applying the cooling power in passing at least one selected from the group consisting of the uncompressed working fluid and the partially compressed working fluid over the wetted surface of an evaporative cooler.

10. The method of claim 9, further comprising adjusting the cooling power in varying flow of liquid over the wetted surface of the cooler.

11. The method of claim 1, further comprising applying the cooling power in injecting a liquid into the working fluid.

12. The method of claim 11, further comprising injecting the liquid into uncompressed working fluid upstream of the compressor.

13. The method of claim 11, further comprising injecting the liquid into a partially compressed working fluid.

14. The method of claim 11, further comprising adjusting the cooling power by varying flow of the liquid injected into the working medium.

15. The method of claim 1, further comprising supplying a supplemental medium into at least a part of the compressed working fluid at a position selected from the group consisting of upstream of the heat supply component, in the heat supply component, immediately downstream of the heat supply component, or any combination thereof, to further increase useful power output of the gas turbine group.

16. The method of claim 15, further comprising supplying steam.

17. The method of claim 15, further comprising supplying water.

18. The method of claim 1, further comprising supplying a fuel mass flow into the working fluid in the heat supply component and burning said fuel mass flow in the working fluid, thus supplying heat.

19. The method of claim 18, further comprising adjusting the heat flux by adjusting the fuel mass flow.

20. A method for operating a gas turbine group, the method comprising:
compressing a working fluid in at least one compressor;
supplying a heat flux to the compressed working fluid in a heat supply component thus heating the compressed working fluid;
passing the heated working fluid from the heat supply component into at least one turbine;
expanding the working fluid in said turbine;
generating shaft power while expanding the working fluid in the turbine;
driving the compressor with a first fraction of the shaft power;
driving a power consumer with remaining useful shaft power;
injecting a liquid droplet mass flow into the working fluid at a position selected from the group consisting of before the compression, during the compression, and both before and during the compression;
regulating the liquid droplet mass flow dependent on a control deviation of the useful shaft power;
evening out the control deviation in regulating the liquid droplet mass flow;
in parallel with regulating the cooling power regulating the heat flux supplied to the compressed working fluid for continuously maintaining at least a turbine inlet temperature of the working fluid substantially constant.

21. A method for operating a gas turbine group, the method comprising:
compressing a working fluid in at least one compressor;
supplying a heat flux to the compressed working fluid in a heat supply component thus heating the compressed working fluid;
passing the heated working fluid from the heat supply component into at least one turbine;
expanding the working fluid in said turbine;
generating shaft power while expanding the working fluid in the turbine;
driving the compressor with a first fraction of the shaft power;
driving a power consumer with remaining useful shaft power;
injecting a liquid droplet mass flow into the working fluid at a position selected from the group consisting of before the compression, during the compression, and both before and during the compression;
regulating the liquid droplet mass flow dependent on a control deviation of the useful shaft power;
evening out the control deviation in regulating the liquid droplet mass flow;
maintaining a variable inlet guide vane row of the compressor at a constant position;
in parallel with regulating the cooling power regulating the heat flux supplied to the compressed working fluid for continuously maintaining at least a turbine inlet temperature of the working fluid substantially constant.

22. A method for operating a gas turbine group, the method comprising:
compressing a working fluid in at least one compressor;
introducing a fuel mass flow into the compressed working fluid in a combustion chamber;

burning fuel from the fuel mass flow in the working fluid in the combustion chamber, thus heating the working fluid;

passing the heated working fluid from a heat supply component into at least one turbine;

expanding the working fluid in said turbine;

generating shaft power while expanding the working fluid in the turbine;

driving the compressor with a first fraction of the shaft power;

driving a power consumer with remaining useful shaft power;

cooling the working fluid by applying a cooling power at a position selected from the group consisting of before the compression, during the compression, and both before and during the compression;

regulating the cooling power dependent on a control deviation of the useful shaft power;

evening out the control deviation in regulating the cooling power;

in parallel with regulating the cooling power regulating the fuel mass flow for continuously maintaining at least a turbine inlet temperature of the working fluid substantially constant.

23. A method for operating a gas turbine group, the method comprising:

compressing a working fluid in at least one compressor;

introducing a fuel mass flow into the compressed working fluid in a combustion chamber;

burning fuel from the fuel mass flow in the working fluid in the combustion chamber, thus heating the working fluid;

passing the heated working fluid from a heat supply component into at least one turbine;

expanding the working fluid in said turbine;

generating shaft power while expanding the working fluid in the turbine;

driving the compressor with a first fraction of the shaft power;

driving a power consumer with remaining useful shaft power;

cooling the working fluid by applying a cooling power at a position selected from the group consisting of before the compression, during the compression, and both before and during the compression;

regulating the cooling power dependent on a control deviation of the useful shaft power;

evening out the control deviation in regulating the cooling power;

maintaining a variable inlet guide vane row of the compressor at a constant position;

in parallel with regulating the cooling power regulating the fuel mass flow for continuously maintaining at least a turbine inlet temperature of the working fluid substantially constant.

* * * * *